United States Patent
Gertz et al.

(10) Patent No.: US 10,841,380 B1
(45) Date of Patent: Nov. 17, 2020

(54) TECHNIQUES FOR SELF-COMPLIANCE

(71) Applicant: Wells Fargo Bank, N.A., San Francisco, CA (US)

(72) Inventors: Barbara Lynne Gertz, Orinda, CA (US); Duke Lee Gunn, Jr., Saint Louis, MO (US); Dennis Frederick Gutknecht, Charlotte, NC (US); Carter C. Hansen, Huntersville, NC (US); Matthew Fitzroy Lynch, Swansea, IL (US); Jonathan Paul Sidarous, House Springs, MO (US); Steven A. Jolley, Chester, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 80 days.

(21) Appl. No.: 15/394,651

(22) Filed: Dec. 29, 2016

(51) Int. Cl.
  *H04L 29/08* (2006.01)

(52) U.S. Cl.
  CPC ............ *H04L 67/12* (2013.01); *H04L 67/02* (2013.01); *H04L 67/22* (2013.01); *H04L 67/306* (2013.01)

(58) Field of Classification Search
  CPC ......... H04L 67/12; H04L 67/02; H04L 67/22; H04L 67/306
  USPC ........................................................ 709/226
  See application file for complete search history.

(56) References Cited

U.S. PATENT DOCUMENTS

| | | | |
|---|---|---|---|
| 6,996,539 B1* | 2/2006 | Wallman | G06Q 40/00 705/35 |
| 7,552,467 B2* | 6/2009 | Lindsay | G06F 21/31 726/5 |
| 7,873,441 B2* | 1/2011 | Synesiou | G06Q 10/00 700/286 |
| 8,577,764 B2 | 11/2013 | Weigman et al. | |
| 8,597,093 B2 | 12/2013 | Engelberg et al. | |
| 8,606,713 B1 | 12/2013 | Ledder et al. | |
| 2005/0287502 A1* | 12/2005 | Southard | G16H 20/60 434/236 |
| 2008/0052139 A1 | 2/2008 | Long | |
| 2009/0018910 A1 | 1/2009 | Jung et al. | |
| 2010/0058446 A1* | 3/2010 | Thwaites | G06F 21/604 726/4 |
| 2010/0235820 A1* | 9/2010 | Khouzam | H04N 21/4143 717/148 |
| 2012/0209760 A1* | 8/2012 | McCarthy | G06Q 40/025 705/38 |
| 2012/0304098 A1 | 11/2012 | Kuulusa | |
| 2013/0013359 A1 | 1/2013 | Kohler et al. | |
| 2013/0018819 A1 | 1/2013 | Willis | |
| 2013/0054314 A1 | 2/2013 | Ross et al. | |
| 2013/0060617 A1 | 3/2013 | Ross et al. | |
| 2013/0103447 A1 | 4/2013 | Melander et al. | |
| 2013/0179316 A1 | 7/2013 | Ross | |

(Continued)

FOREIGN PATENT DOCUMENTS

WO  WO-2014190201 A1  11/2014

*Primary Examiner* — Joseph L Greene
(74) *Attorney, Agent, or Firm* — Schwegman Lundberg & Woessner, P.A.

(57) ABSTRACT

Techniques for assisting a user achieve goals is discussed. In an example, a method can include prompting a user for a goal, periodically checking one or more data sources for activity related to the goal, and electronically modulating a resource based on a comparison of the activity related to the goal and a parameter of the goal.

19 Claims, 5 Drawing Sheets

(56) References Cited

U.S. PATENT DOCUMENTS

| | | | |
|---|---|---|---|
| 2014/0324686 A1* | 10/2014 | Dewan | G06Q 40/02 |
| | | | 705/39 |
| 2016/0034932 A1 | 2/2016 | Sion et al. | |
| 2017/0060654 A1* | 3/2017 | Nandakumar | G06F 11/079 |
| 2017/0195994 A1* | 7/2017 | Cole | H04W 76/10 |
| 2017/0358000 A1* | 12/2017 | Jain | G06Q 30/0244 |

* cited by examiner

TECHNIQUES FOR SELF-COMPLIANCE

TECHNICAL FIELD

Embodiments described herein generally relate to interaction analysis and in particular, but without limitation, to systems and methods for assisting a user with self-compliance to achieve a goal.

BACKGROUND

Personal success for an individual can take many forms one of which is setting a goal and pursuing the goal by performing one or more actions that allow for achievement of the goal. People are very good at setting goals, unfortunately, achieving or even performing one of the steps towards the goals can be elusive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Figure 1:
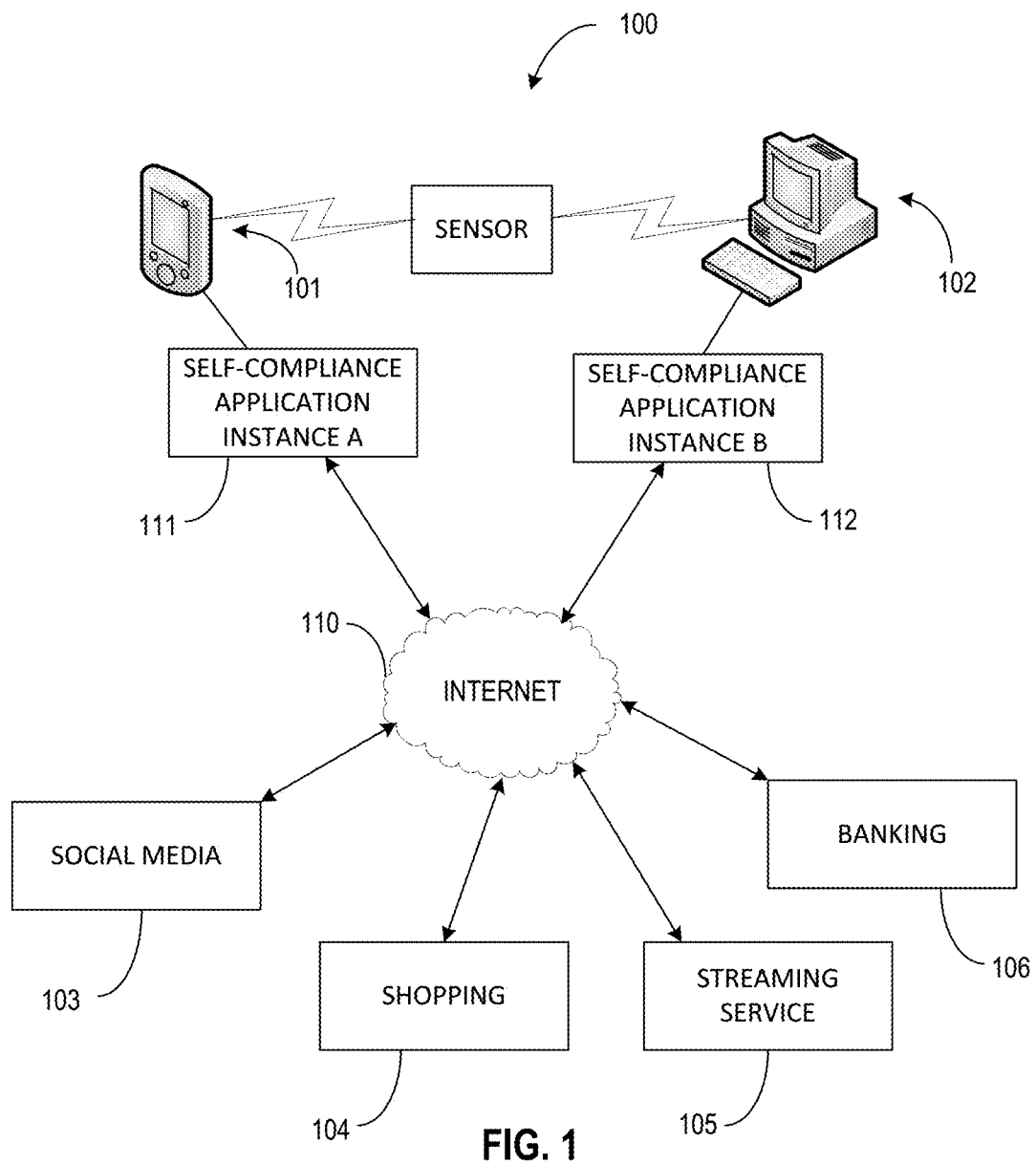
FIG. 1 illustrates generally a system for providing self-compliance to a user's actions to achieve a self-defined goal.

The present inventors have recognized techniques for allowing a user to apply external motivation for achieving a self-defined goal. FIG. 1 illustrates generally a system 100 for providing self-compliance to a user's actions to achieve a self-defined goal. In certain examples, the system 100 can include one or more electronic devices 101, 102 that the user controls. In some examples, the one or more electronic devices 101, 102 can access one or more electronic resources 103, 104, 105, 106 via an electronic network such as the internet 110 for example. Each of the one or more electronic devices 101, 102 can include an instance 111, 112 of a self-compliance application. The self-compliance application 111, 112 can be implemented in dedicated circuitry, in firmware, via instructions stored in memory circuits of the device and designed to execute on processing circuitry of the device, or combination thereof. In certain examples, the self-compliance application 111, 112, as discussed below, can modify or modulate the electronic devices' ability to connect to or make use of internet accessible resources such as social media resources 103, online shopping resources 104, steaming resources 106, banking resources 105 or combinations thereof. In certain examples, the self-compliance application 111, 112, can modulate access to non-network activates accessed using the one or more electronic devices 101, 102, such as games, media or other resources stored on the electronic device 101, 102. In certain examples, access time to an electronic resource can be increased or decreased depending on a user's compliance with a goal or a sub-goal.

Figure 2:
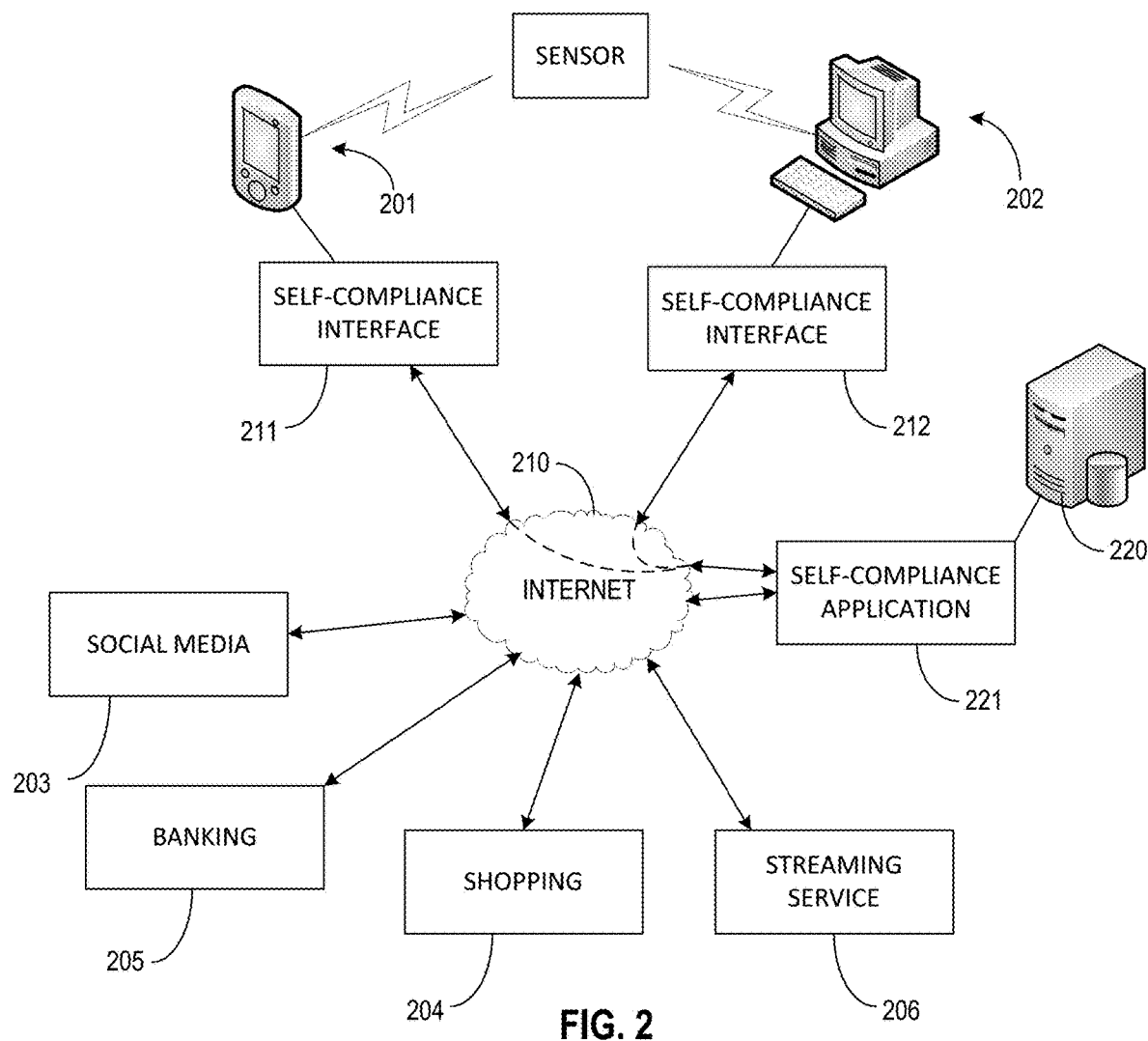
FIG. 2 illustrates generally a system for providing self-compliance to a user's actions to achieve a self-defined goal.

FIG. 2 illustrates generally a system 200 for providing self-compliance to a user's actions to achieve a self-defined goal. In certain examples, the system 200 can include one or more electronic devices 201, 202 that the user controls. In some examples, the one or more electronic devices 201, 202 can access one or more electronic resources 203, 204, 205, 206 via an electronic network such as the internet 210 for example. Each of the one or more electronic devices 201, 202 can include an instance 211, 212 of a self-compliance application interface. The self-compliance application interface can be implemented in dedicated circuitry, in firmware, via instructions stored in memory circuits of the device and designed to execute on processing circuitry of the device, or combination thereof. In certain examples, the instances 211, 212 of the self-compliance interface can communicate to a self-compliance server 220 or self-compliance server application 221, for example operating on a device of a service provider. The self-compliance server application 221 can be implemented in dedicated circuitry, in firmware, via instructions stored in memory circuits of a server device 220 and designed to execute on processing circuitry of the server device 220, or combination thereof. In certain examples, the combination of the self-compliance interface 211, 212 and the self-compliance server application 21, as discussed below, can modify or modulate the electronic devices' ability to connect to or make use of internet accessible resources such as social media resources 203, online shopping resources 204, steaming resources 206, banking resources 205 or combinations thereof.

Figure 3:
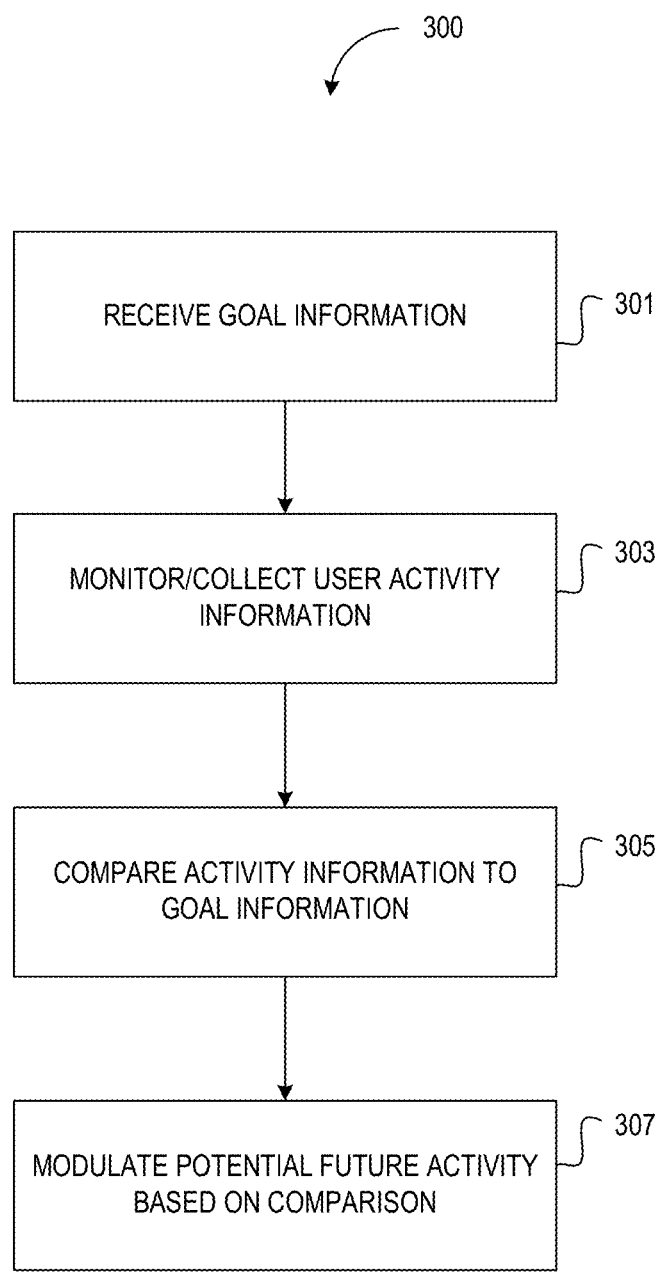
FIG. 3 illustrates generally a flowchart of an example method 300 of operating the system.

FIG. 3 illustrates generally a flowchart of an example method 300 of operating the system. At 301, the system can receive information related to an overall goal for example from a user using an input device to the system. In certain examples, the information can include goal information. A goal can include a financial goal such as saving or investing a particular amount of money, saving or investing a particular amount of money each week, quarter, year, etc. Other financial goals may include regularly reviewing a portfolio such as an investment portfolio, a retirement portfolio, etc., or reviewing a charitable giving plan. Other goals can include making, updating or reviewing a will. In certain examples, a goal can include a health related goal such as a weight loss goal, an exercise or physical activity goal or a healthy eating goal. The goal information can include specific information or parameters related to the goal, information for setting sub-goals or activities to achieve an over-all goal, timeline information or parameters for achieving the goal, and information or parameters for accessing resources that can assist the system with monitoring user activity related to progress toward the goal. Such information can assist the system in accessing data sources that include information related to the user achieving the goal. Such data sources can include electronic bank records, online shopping records, streaming records, investment account records, e-mail records, social media records including social media posting records, records related top information collected from connected devices such as internet of things (IoT) devices, wireless scales, wireless wearable activity monitors or combinations thereof. In certain examples, the system can periodically access the data sources to collect user activity or to check for user activity. In some examples, the system can periodically access the data sources to collect user activity related to one or more goals. In certain examples, the system can includes a graphical user interface (GUI) a user can use to enter the goal information, timeline information and incentive information.

In certain examples, the information can also include incentive information. Incentive information can be used to reward or encourage compliance with achieving the goal. In certain examples, the incentive information can include information related to online banking access, online shopping access, streaming service access, social media access, gaming application access, or combinations thereof. In certain examples, a user interface to the system can allow for entering the appropriate information goal and incentive information. In some examples, the system can communicate with other computer systems to monitor compliance through one or more Application Programming Interfaces (API)s.

At 303, the system can monitor or provide a periodic check of the goal or the progress for completing the overall goal. The information provided by the goal information and the incentive information can be used by the system to monitor activity of the user in complying with a path to the goal. Accessing the user's financial accounts, recording web access activity, receiving information from other devices such as a scale, heart or other physiological monitor, or internet of things IoT-capable devices, can be used to provide activity status of the user with respect to one or more goals. For example, a wireless scale or wearable activity sensor can provide activity status information related to a weight loss goal. Online banking access information can allow the system to monitor and receive activity status information related to savings, investment and other financial goals. Online banking and web activity related to online shopping can provide activity status information related to budgeting goals.

In certain examples, the system can provide an alarm to the user about a periodic check or milestone in progress to the goal at an interval of time before the periodic check. Such an alarm can assist the user in focusing on the next step of accomplishing a goal and can prevent or minimize duration of a penalty if the goal or milestone is not met in time. In some examples, the alarm can include providing a text message to a cell phone number related to the goal. In some examples, the alarm can include providing an e-mail message to an e-mail address related to the goal.

At 305, the system can include a comparator or comparator circuit to compare a user activity, or lack of activity, to an overall goal or an incremental goal. At 307, the system, based on the comparison of user activity to a parameter of a goal, can modulate future potential user activity using the incentive information provided at 303. For examples, failure to achieve a goal by a deadline provided with the goal information can result in the system limiting access to certain resources such as online steaming resources, web browsing resources, online shopping resources, or combinations thereof. In certain examples, where a goal is achieved or activity status information indicates compliance with reaching a goal, the system can modulate certain activities as a reward. For example, upon completing a goal or complying with progress compliant with completing a goal, the system can increase a spending limit, a budget or a withdrawal amount related to a financial account, credit card or one or more online shopping resources. In some examples, upon completing a goal or complying with progress compliant with completing a goal, the system can increase an online streaming time budget for online streaming services, an online gaming time budget, an online time budget for access to online social media access, or combination thereof.

In certain examples, goal information can include activities that may not be able to be automatically monitored by the system. For example, progressive steps towards obtaining a will, making an estate plan, interviewing and establishing a relationship with an investment banker generally are not activities the system will be able to monitor automatically. In such cases, the system can use the goal information to send reminders via a multitude of devices including e-mail, text messages, Bluetooth connections, connections of IoT devices, etc. Compliance can require the user to manually enter information into the system to indicate completion of activities related to the goal. In certain examples, failure to accomplish progress toward the goal by one or more predefined due dates can result in the system providing an onslaught of reminders via one or more of the above mentioned methods or devices. As the non-compliance persists, the reminders can become a nuisance such that compliance with the goal can provide relief from the onslaught of reminders.

Figure 4:
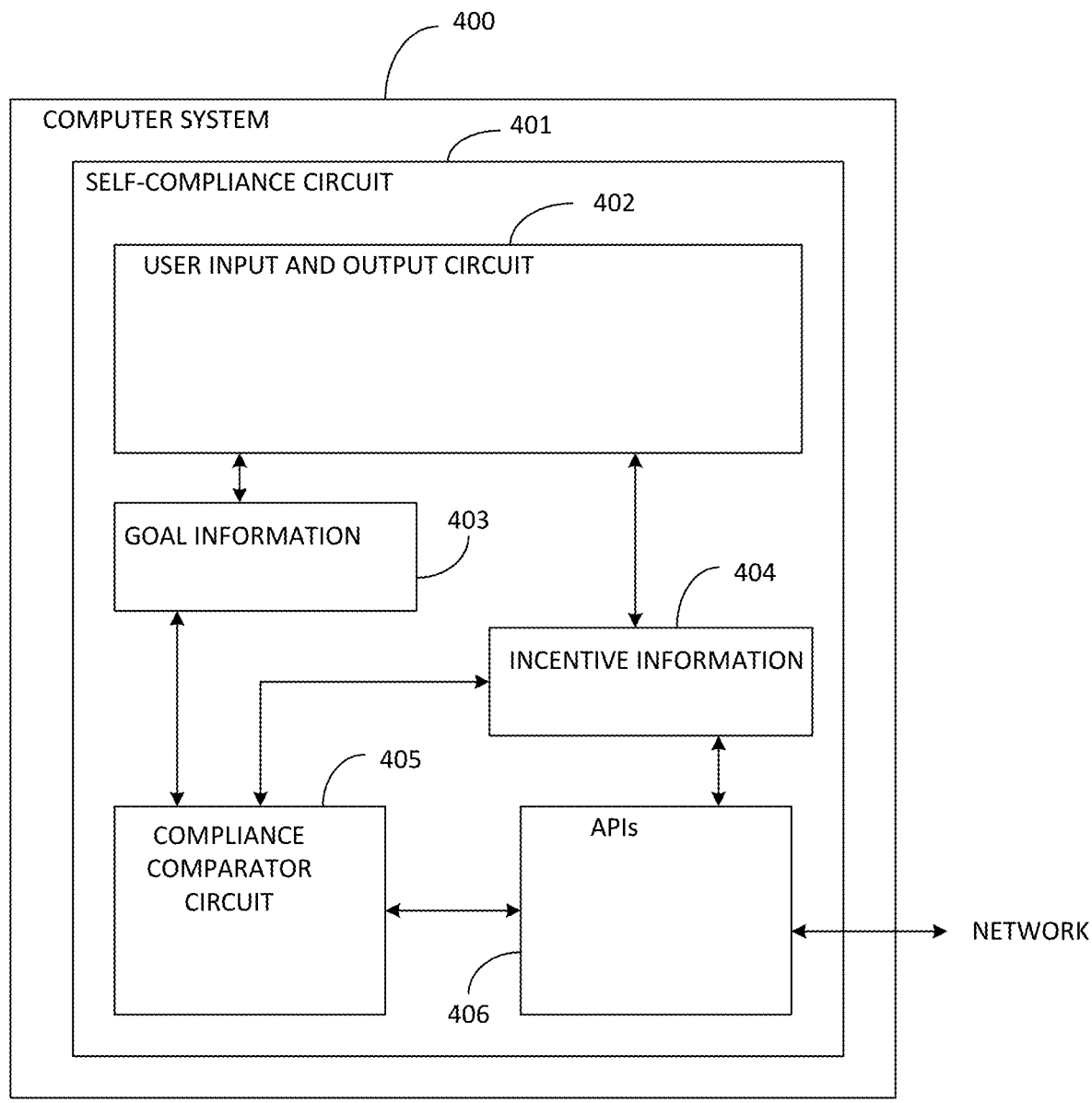
FIG. 4 illustrates generally a block diagram of an example computer system for assisting a user with setting and complying with a user-defined goal.
Figure 5:
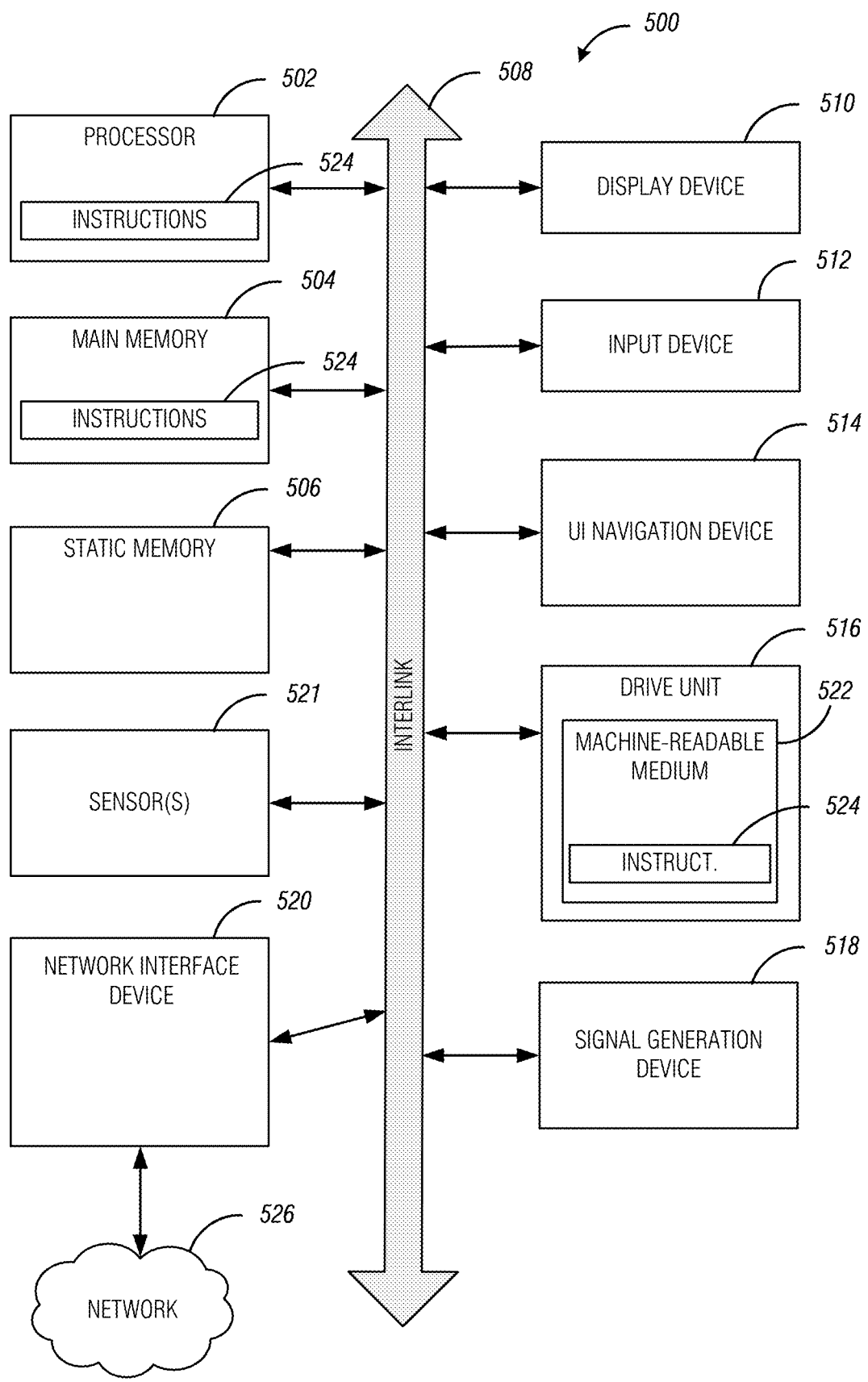
FIG. 5 is a block diagram illustrating a machine in the example form of a computer system within which a set or sequence of instructions may be executed to cause the machine to perform any one of the methodologies discussed herein, according to an example embodiment.

FIG. 4 illustrates generally a block diagram of an example computer system 400 for assisting a user with setting and complying with a user-defined goal. The computer system 400 can include a self-compliance module or circuit 401 that can make use of computer system resources for assisting a user with setting and achieving a goal. The self-compliance module or circuit 401 can include a user input and output circuit 402, goal information memory 403, incentive information memory 404, a compliance comparator circuit 405 and one or more APIs 406. The user input and output circuit 402 can receive goal information, timeline information and incentive information from the user, and can generate status information for presentation to the user. The status information can include graphical and textual information indicative of the user's compliance with previously received goal information and timeline information. In certain examples, the user input and output circuit 402 can generate information for presentation to the user indicative of incentive activity. Presentation of information to the user can make use of a graphical user interface of the computer system 400, for example. The goal information memory 403 can be used to store goal related information received from the user. In certain examples, some timeline information can be stored in the goal information memory 403. Such timeline information can assist in setting periodic alarms for collecting and checking for user compliance with a goal or sub-goal. The incentive information memory 404 can be used to store incentive related information received from the user and to collect user activity information. Incentive information can include information to assist the computer system 400 in accessing resources for collecting user activity related to compliance with a goal, information for modulating electronic access to network resources and non-network resources, and timeline information for assisting with the modulation of the network resources and the non-network resources. The compliance comparator circuit 405 can receive information from the goal information memory 403 and user activity information from the incentive memory 404 and can compare the user activity with expected activity for compliance with a goal. Depending on the result of each comparison, the APIs 406 can be programmed to modulate electronic access to network resources and non-network resources, for example, using the access information and time line information of the incentive memory 404.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may include hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

FIG. 4 is a block diagram illustrating a machine in the example form of a computer system 500, within which a set or sequence of instructions may be executed to cause the machine to perform any one of the methodologies for assisting a user in setting up and complying with one or more goals as discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 6G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

EXAMPLES AND NOTES

In Example 1, a non-transitory computer readable medium including instructions for assisting compliance with programmable goals, the instructions, when executed by a machine, cause the machine to perform operations that can include prompting a user for a goal, periodically checking one or more data sources for activity related to the goal, and electronically modulating a resource based on a comparison of the activity related to the goal and a parameter of the goal.

In Example 2, the goal of Example 1 optionally includes at least one of a financial planning goal, a charitable giving goal or an estate planning goal.

In Example 3, the activity of any one or more of Examples 1-2 optionally includes a periodic update activity related to the goal.

In Example 4, the non-transitory computer readable medium of any one or more of Examples 1-3 optionally includes operations for providing an alarm to the user about a periodic check at an interval of time before the periodic check.

In Example 5, the providing an alarm of any one or more of Examples 1-4 optionally includes providing a text message to a cell phone number related to the goal.

In Example 6, the providing an alarm of any one or more of Examples 1-5 optionally includes providing an e-mail message to an e-mail address related to the goal.

In Example 7, the electronic modulating of any one or more of Examples 1-6 optionally includes modulating periodic access time to internet communication.

In Example 8, the electronic modulating of any one or more of Examples 1-7 optionally includes modulating access time to a social media application.

In Example 9, the electronic modulating of any one or more of Examples 1-8 optionally includes modulating access time to a video streaming application.

In Example 10, the electronic modulating of any one or more of Examples 1-9 optionally includes reducing an on-line shopping budget if the activity fails to satisfy the parameter.

In Example 11, the electronic modulating of any one or more of Examples 1-10 optionally includes electronically reducing a credit card limit if the activity fails to satisfy the parameter.

In Example 12, the electronic modulating of any one or more of Examples 1-3 optionally includes electronically reducing a cash withdrawal limit if the activity fails to satisfy the parameter.

In Example 13, a method can include prompting a user for a goal using a user input device of a computer, periodically checking one or more data sources for activity related to the goal using the computer, and electronically modulating a resource of the computer based on a comparison of the activity related to the goal and a parameter of the goal.

In Example 14, the goal of any one or more of Examples 1-13 optionally includes at least one of a financial planning goal, a charitable giving goal, or an estate planning goal.

In Example 15, the method of any one or more of Examples 1-14 optionally includes providing an alarm to the user about a periodic check at an interval of time before the periodic check.

In Example 16, the electronic modulating of any one or more of Examples 1-15 optionally includes modulating periodic access time to internet communication.

In Example 17, the electronic modulating of any one or more of Examples 1-16 optionally includes modulating access time to a social media application.

In Example 18, the electronic modulating of any one or more of Examples 1-17 optionally includes decreasing access time to a video streaming application if the activity fails to satisfy the parameter.

In Example 19, the electronic modulating of any one or more of Examples 1-3 optionally includes electronically reducing at least one of access time to a video streaming application, an on-line shopping budget, a credit card limit, or a cash withdrawal limit, if the activity fails to satisfy the parameter.

In Example 20, the electronic modulating a resource of any one or more of Examples 1-19 optionally includes increasing at least one of periodic access time to internet communication, access time to a social media application, access time to a video steaming application, an on-line shopping budget, a credit card limit, or a cash withdrawal limit if the activity satisfies the parameter.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A non-transitory computer readable medium including instructions for assisting compliance with programmable goals, the instructions, when executed by a machine, cause the machine to perform operations comprising:
   prompting a user for a goal and a completion date, the goal including an identification of a computing resource to be limited if the goal is not met, wherein the goal is a financial goal;
   periodically checking one or more data sources for activity related to the goal;
   determining based on evaluation of financial records from the one or more data sources, at a first time after the completion date, that the goal is not met;
   in response to determining that the goal is not met, originating a first application programmer interface (API) call with instructions to electronically limit access to the computing resource based on a comparison of the activity related to the goal and a parameter of the goal;

transmitting the first API call to a computing device of the user, wherein upon receipt of the first API call, the computing device limits access to the computing resource executing on the computing device, wherein the access limit restricts access to one or more features of the computing resource based on the instructions from the first API call;

determining, at a second time subsequent to the first time, that the goal has been met;

in response to determining that the goal has been met, generating a time budget for the computing resource and originating a second API call with instructions to remove the access limitation to the computing resource; and transmitting the second API call to the computing device of the user, wherein upon receipt of the second API call, the computing device enables access to the computing resource executing on the computing device while time remains available in the time budget, wherein enabling access to the computing resource removes the access restrictions to the one or more features of the computing resource based on the instructions from the second API call.

2. The non-transitory computer readable medium of claim 1, wherein the goal includes at least one of a financial planning goal, a charitable giving goal or an estate planning goal.

3. The non-transitory computer readable medium of claim 1, wherein the activity includes a periodic update activity related to the goal.

4. The non-transitory computer readable medium of claim 1, including providing an alarm to the user about a periodic check at an interval of time before the periodic check, the alarm indicating progress toward the goal based on timeline information received from the user.

5. The non-transitory computer readable medium of claim 1, wherein electronically limiting access includes limiting access time to a social media application.

6. The non-transitory computer readable medium of claim 5, wherein providing an alarm includes providing an e-mail message to an e-mail address related to the goal.

7. The non-transitory computer readable medium of claim 1, wherein the electronically limiting access includes limiting periodic access time to internet communication.

8. The non-transitory computer readable medium of claim 5, wherein providing an alarm includes providing a text message to a cell phone number related to the goal.

9. The non-transitory computer readable medium of claim 1, wherein electronically limiting access includes limiting access time to a video streaming application.

10. The non-transitory computer readable medium of claim 1, wherein electronically limiting access includes reducing an on-line shopping budget if the activity fails to satisfy the parameter.

11. The non-transitory computer readable medium of claim 1, wherein electronically limiting access includes electronically reducing a credit card limit if the activity fails to satisfy the parameter.

12. The non-transitory computer readable medium of claim 1, wherein electronically limiting access includes electronically reducing a cash withdrawal limit if the activity fails to satisfy the parameter.

13. A method comprising:

prompting a user for a goal and a completion date, using a user input device of a computer, the goal including an identification of a computing resource of the computer to be limited if the goal is not met, wherein the goal is a financial goal;

periodically checking one or more data sources for activity related to the goal using a processor of the computer;

determining based on evaluation of financial records from the one or more data sources, at a first time after the completion date, that the goal is not met;

in response to determining that the goal is not met, originating a first application programmer interface (API) call with instructions to electronically limit access to the computing resource of the computer based on a comparison of the activity related to the goal and a parameter of the goal;

transmitting the first API call to a computing device of the user, wherein upon receipt of the first API call, the computing device limits access to the computing resource executing on the computing device, wherein the access limit restricts access to one or more features of the computing resource based on the instructions from the first API call;

determining, at a second time subsequent to the first time, that the goal has been met;

in response to determining that the goal has been met, generating a time budget for the computing resource and originating a second API call with instructions to remove the access limitation to the computing resource at the computer; and transmitting the second API call to the computing device of the user, wherein upon receipt of the second API call, the computing device enables access to the computing resource executing on the computing device while time remains available in the time budget, wherein enabling access to the computing resource removes the access restrictions to the one or more features of the computing resource based on the instructions from the second API call.

14. The method of claim 13, wherein the goal includes at least one of a financial planning goal, a charitable giving goal, or an estate planning goal.

15. The method of claim 13, including providing an alarm to the user about a periodic check at an interval of time before the periodic check, the alarm indicating progress toward the goal based on timeline information received from the user.

16. The method of claim 13, wherein the electronically limiting access includes limiting periodic access time to internet communication.

17. The method of claim 13, wherein electronically limiting access includes limiting access time to a social media application.

18. The method of claim 13, wherein electronically limiting access includes decreasing access time to a video streaming application if the activity fails to satisfy the parameter.

19. The method of claim 13, wherein electronically limiting access includes electronically reducing at least one of access time to a video streaming application, an on-line shopping budget, a credit card limit, or a cash withdrawal limit, if the activity fails to satisfy the parameter.

* * * * *